United States Patent
Schwarz et al.

(10) Patent No.: US 10,605,104 B2
(45) Date of Patent: Mar. 31, 2020

(54) MULTI-CIRCUIT LUBRICATION SYSTEM FOR A TURBINE ENGINE

(71) Applicant: United Technologies Corporation, Hartford, CT (US)

(72) Inventors: Frederick M. Schwarz, Glastonbury, CT (US); Simon Pickford, Amston, CT (US)

(73) Assignee: United Technologies Corporation, Farmington, CT (US)

( * ) Notice: Subject to any disclaimer, the term of this patent is extended or adjusted under 35 U.S.C. 154(b) by 675 days.

(21) Appl. No.: 14/765,217

(22) PCT Filed: Feb. 4, 2014

(86) PCT No.: PCT/US2014/014592
§ 371 (c)(1),
(2) Date: Jul. 31, 2015

(87) PCT Pub. No.: WO2014/123857
PCT Pub. Date: Aug. 14, 2014

(65) Prior Publication Data
US 2015/0361811 A1 Dec. 17, 2015

Related U.S. Application Data

(60) Provisional application No. 61/761,501, filed on Feb. 6, 2013.

(51) Int. Cl.
*F01D 9/06* (2006.01)
*F01D 25/18* (2006.01)
(Continued)

(52) U.S. Cl.
CPC ............. *F01D 9/065* (2013.01); *F01D 25/18* (2013.01); *F02C 7/06* (2013.01); *F02C 7/14* (2013.01);
(Continued)

(58) Field of Classification Search
CPC .......... F01D 9/065; F01D 25/18; F01D 25/20; F01D 25/12; F01D 25/125; F02C 7/06;
(Continued)

(56) References Cited

U.S. PATENT DOCUMENTS 3,754,484 A 8/1973 Roberts
4,020,632 A 5/1977 Coffinberry et al.
(Continued)

OTHER PUBLICATIONS

EP Extended Search Report dated Jan. 21, 2016.
(Continued)

*Primary Examiner* — Mark A Laurenzi
*Assistant Examiner* — Loren C Edwards
(74) *Attorney, Agent, or Firm* — Getz Balich LLC

(57) ABSTRACT

A turbine engine system includes a first lubricant circuit, a second lubricant circuit, a plurality of engine stages and a shaft. The first lubricant circuit includes a first turbine engine component that is fluidly coupled with a first lubricant heat exchanger. The first turbine engine component includes a gear train, which connects a first of the engine stages to a second of the engine stages. The second lubricant circuit includes a second turbine engine component that is fluidly coupled with a second lubricant heat exchanger. The second lubricant circuit is fluidly coupled with the first lubricant circuit, and the second turbine engine component includes a bearing. The shaft is supported by the bearing, and connected to one of the engine stages.

15 Claims, 9 Drawing Sheets

(51) Int. Cl.
F02C 7/06 (2006.01)
F02C 7/14 (2006.01)
(52) U.S. Cl.
CPC .................. F05D 2260/213 (2013.01); F05D 2260/40311 (2013.01); Y02T 50/676 (2013.01)
(58) Field of Classification Search
CPC .... F02C 7/14; F02C 7/36; F02C 7/224; F05D 2260/213; F05D 2260/40311; Y02T 50/676
USPC ....................................... 60/39.08
See application file for complete search history.

(56) References Cited

U.S. PATENT DOCUMENTS

| | | | | |
|---|---|---|---|---|
| 4,041,697 | A | * | 8/1977 | Coffinberry ............... F02C 7/14 123/41.33 |
| 4,741,152 | A | * | 5/1988 | Burr ........................ F01D 25/18 60/39.08 |
| 5,433,674 | A | | 7/1995 | Sheridan et al. |
| 6,223,616 | B1 | | 5/2001 | Sheridan |
| 7,387,189 | B2 | | 6/2008 | James et al. |
| 7,591,754 | B2 | | 9/2009 | Duong et al. |
| 7,694,505 | B2 | | 4/2010 | Schilling |
| 7,824,305 | B2 | | 11/2010 | Duong et al. |
| 7,836,680 | B2 | | 11/2010 | Schwarz et al. |
| 7,908,840 | B2 | | 3/2011 | Schwarz et al. |
| 7,926,260 | B2 | | 4/2011 | Sheridan et al. |
| 7,997,062 | B2 | | 8/2011 | Sun et al. |
| 8,020,665 | B2 | | 9/2011 | Sheridan et al. |
| 8,205,427 | B2 | | 6/2012 | Schwarz et al. |
| 8,205,432 | B2 | | 6/2012 | Sheridan |
| 8,215,454 | B2 | | 7/2012 | Portlock et al. |
| 8,230,974 | B2 | | 7/2012 | Parnin |
| 8,246,503 | B2 | | 8/2012 | Sheridan et al. |
| 8,256,576 | B2 | | 9/2012 | Glahn et al. |
| 8,257,024 | B1 | | 9/2012 | Phillips et al. |
| 8,777,792 | B2 | | 7/2014 | Imai et al. |
| 2007/0264133 | A1 | | 11/2007 | Schwarz et al. |
| 2008/0121376 | A1 | * | 5/2008 | Schwarz ................ F01D 15/10 165/104.28 |
| 2009/0313999 | A1 | | 12/2009 | Hunter et al. |
| 2010/0205977 | A1 | | 8/2010 | Annigeri et al. |
| 2012/0085528 | A1 | | 4/2012 | Schwarz et al. |

OTHER PUBLICATIONS

Karl Fledderjohn, "The TFE31-5: Evolution of a Decade of Business Jet Service", Business Aircraft Meeting & Exposition, Apr. 12-15, 1983.
Michael Cusick, "Avco Lycoming's ALF 502 High Bypass Fan Engine," Business Aircraft Meeting & Exposition, Apr. 7-10, 1981.
Dickey et al. "The Evolution and Development Status of the ALF 502 Turbofan Engine", National Aerospace Engineering and Manufacturing Meeting, Oct. 2-5, 1972.
"Honeywell TFE731", Jane's Aero-Engines, Jul. 18, 2012.
"Honeywell LF507", Jane's Aero-Engines, Feb. 9, 2012.
"Honeywell LF502", Jane's Aero-Engines, Feb. 9, 2012.
"Rolls-Royce M45H", Jane's Aero-Engines, Feb. 24, 2010.
"Aviadvigatel D-110", Jane's Aero-Engines, Jun. 1, 2010.
"Turbomeca Aubisque", Jane's Aero-Engines, Nov. 2, 2009.
"Ivchenko-Progress D-436", Jane's Aero-Engines, Feb. 8, 2012.
"Ivchenko-Progress AI-727M", Jane's Aero-Engines, Nov. 27, 2011.
"Ivchenko-Progress D-727", Jane's Aero-Engines, Feb. 7, 2012.
"Avco Lycoming ALF502R-2 Cutaway", http://www.flightglobal.com/airspace/media/aeroenginesjetcutaways/avco-lycoming-alf502r-2-cutaway-5582.aspx, Nov. 7, 2007.
"Textron Lycoming LF507F Cutaway", http://www.flightglobal.com/airspace/media/aeroenginesjetcutaways/default.aspx?mq=lycoming+lf507f, Nov. 7, 2007.
"Garrett TFE531 Cutaway", http://www.flightglobal.com/airspace/media/aeroenginesjetcutaways/garrett-tfe531-cutaway-5650.aspx, Nov. 7, 2007.
"Garrett TFE731", http://en.wikipedia.org/wiki/TFE731, Aug. 31, 2012.
"Honeywell LF507", http://en.wikipedia.org/wiki/Honeywell_LF_507, May 4, 2012.
Lycoming ALF 502, http://en.wikipedia.org/wiki/Lycoming_ALF502, May 11, 2012.
"Geared Turbofan" http://en.wikipedia.org/wiki/Geared_turbofan, Oct. 5, 2012.
"ALF 502 Turbofan Engine", https://commerce.honeywell.com/webapp/wcs/stores/servlet/eSystemDisplay?catalogId=10251&storeId=10651&categoryId=31946&langId=-1.
"LF507 Turbofan Engine", http://www.honeywell.com/sites/portal?smap=aerospace&page=Propulsion_Engines3&theme=T5&catID=CDAB5CA0F-004C-6DBB-B50C-20859E156016&id=H4AF3B740-B3B1-6FB7-9229-2C8E98E7BC80&sel=2.
"Turbofan", http://people.rit.edu/pnveme/EMEM560n/propel/turbofan.html.
"AD: Honeywell", http://www.aero-news.net/Subscribe.cfm?do=main.textpost&id=e8ad917f-adf6-4728-9141-cc1aad5bed8c, Aug. 7, 2009.
"Manufacturing Breakdown", http://www.shockcone.co.uk/bae146/technical.htm.
"TFE731, CFE738 & ATF3 Turbofan Engines", http://www.honeywell.com/sites/portal?smap=aerospace&page=Turbofan-Products&theme=T6.
"Honeywell's Thirty-Plus Year Turbofan Engine Legacy", Business & Commercial Aviation, Nov. 2006, p. 59.
"Quiet, Powered-Lift Propulsion", NASA Conference Publication 2077, Nov. 14-15, 1978.

* cited by examiner

US 10,605,104 B2

MULTI-CIRCUIT LUBRICATION SYSTEM FOR A TURBINE ENGINE

This application claims priority to PCT Patent Application No. PCT/US14/14592 filed Feb. 4, 2014, which claims priority to U.S. Patent Appln. No. 61/761,501 filed Feb. 6, 2013.

BACKGROUND OF THE INVENTION

1. Technical Field

This disclosure relates generally to a turbine engine and, more particularly, to a lubrication system for multiple turbine engine components.

2. Background Information

A typical geared turbofan engine includes a fan section, a compressor section, a combustor section and a turbine section. A rotor of the fan section is connected to and driven by a rotor of the turbine section through a shaft and a gear train. The turbofan engine also includes a lubrication system that circulates lubrication oil through the gear train and a plurality of bearings that support the shaft. The lubrication oil lubricates as well as cools the components of the gear train and the bearings.

There is a need in the art for an improved lubrication system for a turbine engine.

SUMMARY OF THE DISCLOSURE

According to an aspect of the invention, a turbine engine system is provided that includes a first lubricant circuit, a second lubricant circuit, a plurality of engine stages and a shaft. The first lubricant circuit includes a first turbine engine component that is fluidly coupled with a first lubricant heat exchanger. The first turbine engine component includes a gear train, which connects a first of the engine stages to a second of the engine stages. The second lubricant circuit includes a second turbine engine component that is fluidly coupled with a second lubricant heat exchanger. The second lubricant circuit is fluidly coupled with the first lubricant circuit, and the second turbine engine component includes a bearing. The shaft is supported by the bearing, and connected to one of the engine stages.

According to another aspect of the invention, a turbine engine system is provided that includes a first lubricant circuit, a second lubricant circuit and a third lubricant circuit. The first lubricant circuit includes a first turbine engine component that is fluidly coupled with a first lubricant heat exchanger. The second lubricant circuit includes a second turbine engine component that is fluidly coupled with a second lubricant heat exchanger. The second lubricant circuit is fluidly coupled with the first lubricant circuit. The third lubricant circuit includes a generator.

The first lubricant circuit may be configured in parallel with the second lubricant circuit.

The system may include a lubricant reservoir that is fluidly coupled with the first lubricant circuit and the second lubricant circuit. The lubricant reservoir may receive lubricant from the first lubricant circuit and the second lubricant circuit, and provide the lubricant to the first lubricant circuit and the second lubricant circuit. The system may also or alternatively include a lubricant pump. The lubricant pump may include an outlet that is fluidly coupled with the first lubricant circuit and the second lubricant circuit.

The first lubricant circuit may include a lubricant pump, a lubricant reservoir and/or another lubricant heat exchanger. In addition or alternatively, the second lubricant circuit may include a lubricant pump, a lubricant reservoir and/or another lubricant heat exchanger.

The first lubricant heat exchanger may be configured as a lubricant-fuel heat exchanger or a lubricant-air heat exchanger. In addition or alternatively, the second lubricant heat exchanger may be configured as a lubricant-fuel heat exchanger or a lubricant-air heat exchanger.

The first lubricant heat exchanger may be configured as or include a lubricant-air heat exchanger with a first airflow area. In addition or alternatively, the second lubricant heat exchanger may be configured as or include a lubricant-air heat exchanger with a second airflow area. The first airflow area may be greater than the second airflow area. Alternatively, the first airflow area may be less than or substantially equal to the second airflow area.

The system may include a valve for regulating air flow through a lubricant-air heat exchanger. The first lubricant heat exchanger may be configured as or include the lubricant-air heat exchanger.

The system may include a valve for regulating air flow through a lubricant-air heat exchanger. The second lubricant heat exchanger may be configured as or include the lubricant-air heat exchanger.

The first of the engine stages may be configured as or include a fan stage or any other engine stage. The second of the engine stages may be configured as or include a compressor stage or any other engine stage.

The system may include a gear train, a bearing, a plurality of engine stages and a shaft that is supported by the bearing. The first turbine engine component may be configured as or include the gear train, which connects a first of the engine stages to a second of the engine stages. The second turbine engine component may be configured as or include the bearing. The shaft may be connected to one of the engine rotors.

The first turbine engine component may be configured as or include a first bearing. The second turbine engine component may be configured as or include a second bearing. The second turbine engine component may also or alternatively be configured as or include a heat exchanger for cooling electronic equipment.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

DETAILED DESCRIPTION OF THE INVENTION

Figure 1:
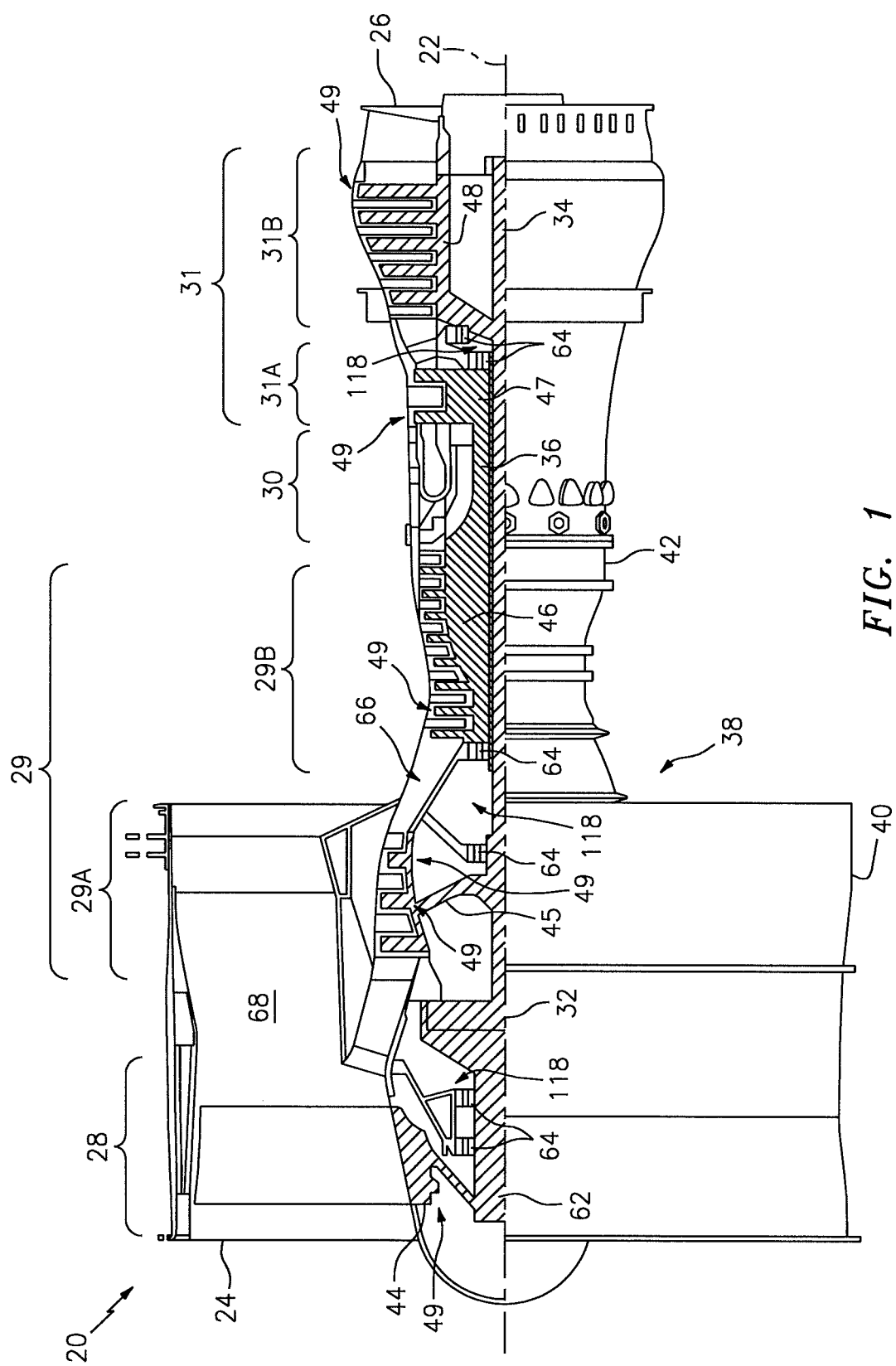
FIG. 1 is a side cutaway illustration of a geared turbine engine.

FIG. 1 is a side cutaway illustration of a geared turbine engine 20 that extends along an axis 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine 20 also includes a gear train 32 (e.g., an epicyclic gear train), a low speed shaft 34, and a high speed shaft 36.

The engine sections 28-31 are arranged sequentially along the axis 22 within an engine housing 38, which includes a first engine case 40 (e.g., a fan nacelle) and a second engine case 42 (e.g., a core nacelle). Each of the engine sections 28, 29A, 29B, 31A and 31B includes a respective engine rotor 44-48. Each of the engine rotors 44-48 includes one or more engine stages 49, each of which includes a plurality of rotor blades arranged circumferentially around and connected to (e.g., formed integral with or mechanically fastened, welded, brazed or otherwise adhered to) a respective rotor disk.

Figure 2:
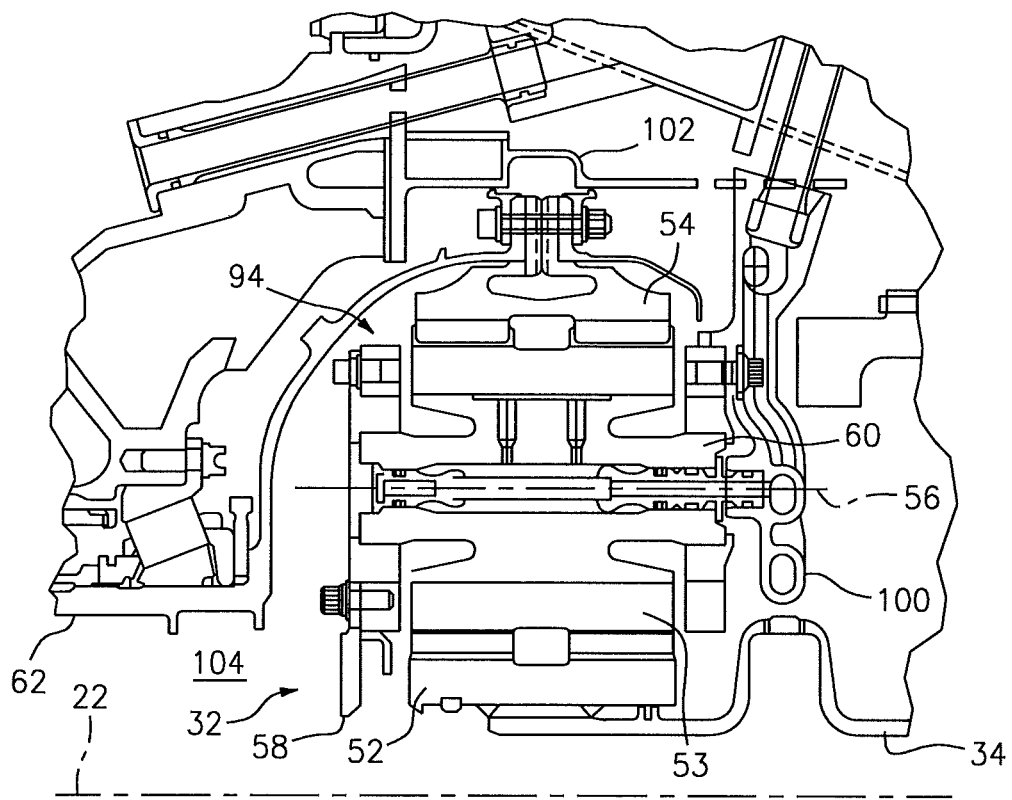
FIG. 2 is a partial sectional illustration of a gear train connected between a plurality of shafts.
Figure 3:
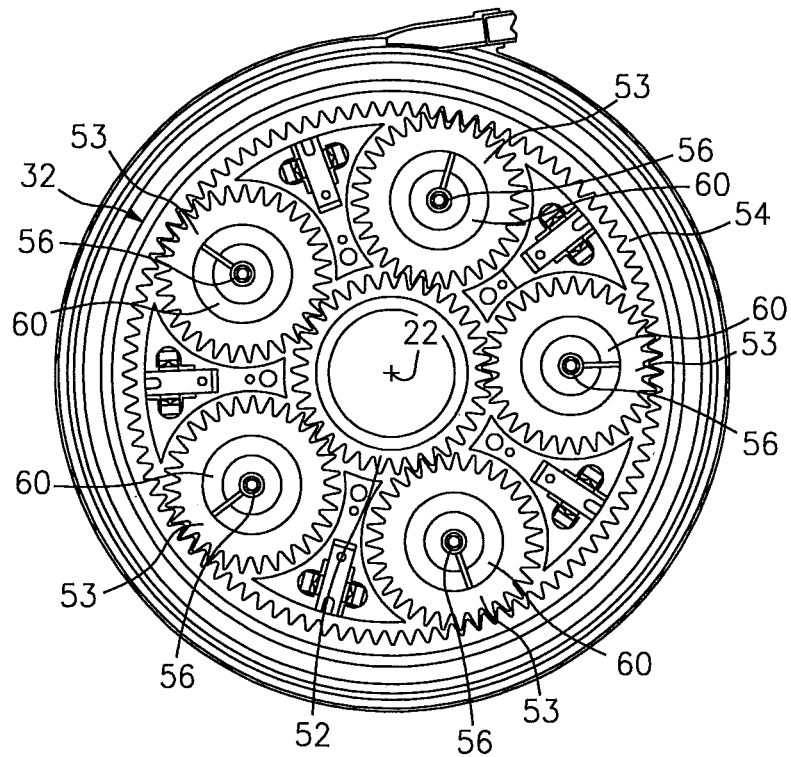
FIG. 3 is a side illustration of the gear train of FIG. 2.

Referring to FIGS. 2 and 3, the gear train 32 includes a plurality of gears 52-54 arranged in a star gear train configuration. Alternatively, the gears 52-54 may be arranged in a planetary gear train configuration, or any other type of gear train configuration. The gears include a sun gear 52, one or more star gears 53, and a ring gear 54.

The sun gear 52 is rotatable about the axis 22. The sun gear 52 is connected to the low speed shaft 34 through a joint such as a spline joint. The star gears 53 are arranged circumferentially around the axis 22. The star gears 53 are radially meshed between the sun gear 52 and the ring gear 54. Each of the star gears 53 is rotatable about a respective axis 56. Each of the star gears 53 is rotatably connected to a stationary gear carrier 58 through a bearing 60. The bearing 60 may be a journal bearing, or alternatively any other type of bearing such as a roller element bearing, etc. The gear carrier 58 is connected to the second engine case 42 (see FIG. 1) through a support strut and/or a flexible support. The ring gear 54 is rotatable about the axis 22. The ring gear 54 is connected to a shaft 62 through a joint such as a bolted flange joint. Referring again to FIG. 1, the shaft 62 is connected to the fan rotor 44. The gear train 32 therefore mechanically connects and transfers power (e.g., torque) between the fan stage 49 of the fan rotor 44 and one or more of the compressor stages 49 of the LPC rotor 45. In other embodiments, however, the gear train 32 may connect and transfer power between a plurality of engine stages of one or more of the engine sections 28-31.

The fan rotor 44 is connected to the gear train 32 through the shaft 62. The gear train 32 and the LPC rotor 45 are connected to and driven by the LPT rotor 48 through the low speed shaft 34. The HPC rotor 46 is connected to and driven by the HPT rotor 47 through the high speed shaft 36. The shaft 62, the low speed shaft 34 and the high speed shaft 36 are rotatably supported by a plurality of shaft support bearings 64. Each of the bearings 64 is connected to the engine housing 38 and the second engine case 42 by at least one stator such as, for example, an annular support strut. One or more of the bearings 64 are each configured as a roller element thrust bearing, or alternatively any other type of roller element bearing. One or more of the bearings 64 may alternatively each be configured as a journal bearing or any other type of bearing.

Air enters the engine 20 through the airflow inlet 24, and is directed through the fan section 28 and into an annular core gas path 66 and an annular bypass gas path 68. The air within the core gas path 66 may be referred to as "core air". The air within the bypass gas path 68 may be referred to as "bypass air" or "cooling air". The core air is directed through the engine sections 29-31 and exits the engine 20 through the airflow exhaust 26. Within the combustor section 30, fuel is injected into and mixed with the core air and ignited to provide forward engine thrust. The bypass air is directed through the bypass gas path 68 and out of the engine 20 to provide additional forward engine thrust or reverse thrust via a thrust reverser. The bypass air may also be utilized to cool various turbine engine components within one or more of the engine sections 29-31.

Figure 4:
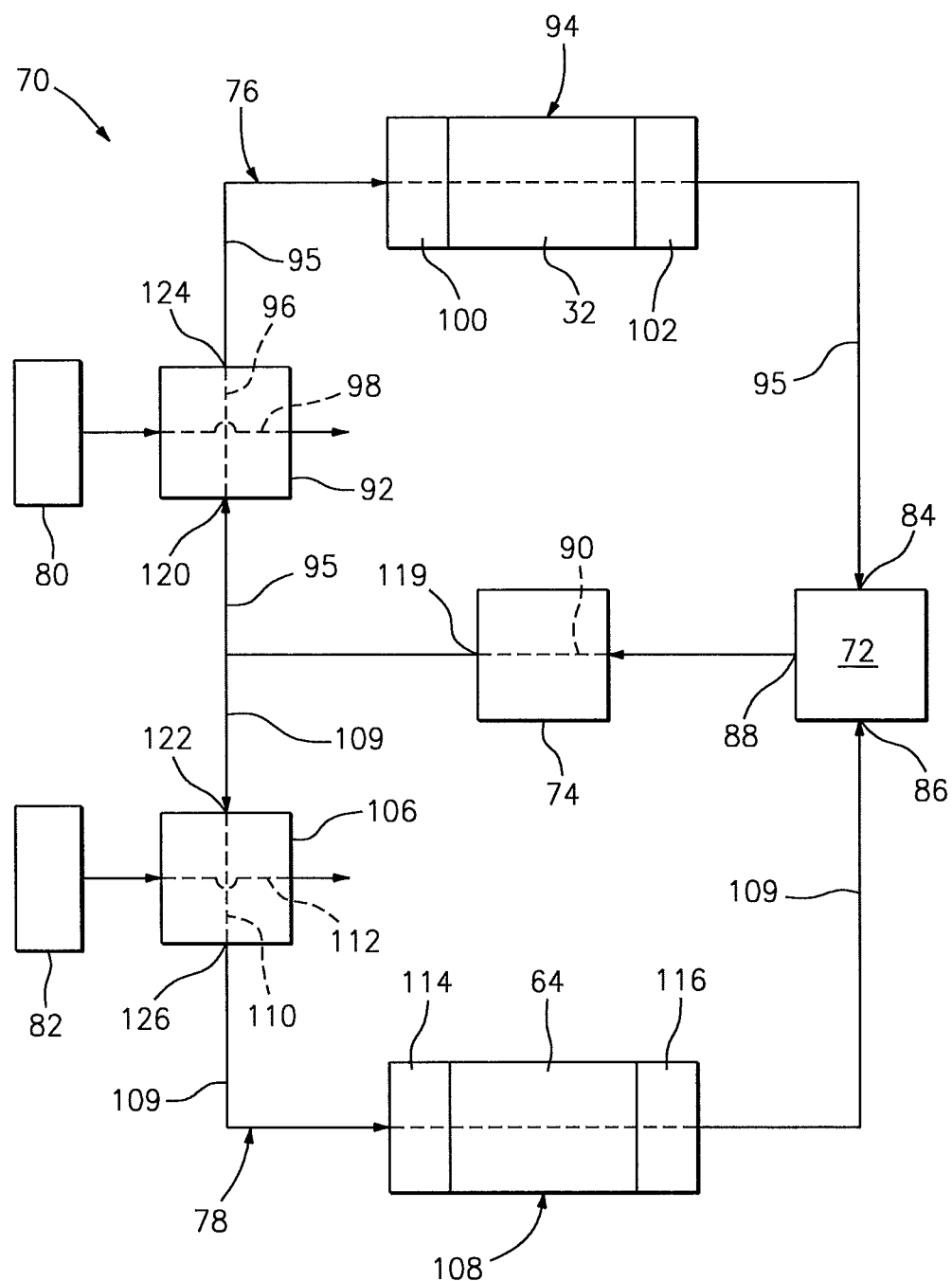
FIG. 4 is a schematic illustration of a multi-circuit lubrication system for the engine of FIG. 1.

FIG. 4 is a schematic illustration of a multi-circuit lubrication system 70 for the engine 20 of FIG. 1. The lubrication system 70 includes a lubricant reservoir 72, a lubricant pump 74, a first lubricant circuit 76, a second lubricant circuit 78, and one or more air valves 80 and 82. The first lubricant circuit 76 (e.g., a gear train lubricant circuit) provides lubricant to and is fluidly coupled with the gear train 32. The second lubricant circuit (e.g., an engine lubricant circuit) provides lubricant to and is fluidly coupled with one or more of the bearings 64. The first lubricant circuit 76 and/or the second lubricant circuit 78 may also or alternatively respectively provide lubricant to and be fluidly coupled with one or more other components of the engine 20.

The lubricant reservoir 72 includes a first inlet 84, a second inlet 86 and an outlet 88.

The lubricant pump 74 is configured as a mechanical pump. The lubricant pump 74 is driven by a turbine engine component such as an accessory gearbox (not shown), one of the engine rotors 44-48, one of the shafts 34 and 36, or any other rotor included in the engine 20. Alternatively, the lubricant pump 74 may be configured as an electrical pump. The lubricant pump 74 includes a lubricant passage 90 through which lubricant is pumped using an impeller or any other type of pumping mechanism.

The first lubricant circuit 76 includes a lubricant heat exchanger 92 and a turbine engine component 94, which are fluidly coupled together by one or more passages 95. One or more of these passages 95 may be defined by one or more conduits (e.g., pipes, hoses, etc.). One or more of the passages 95 may also or alternatively be defined by one or more apertures (e.g., through holes, channels, etc.) that extend through (or into) and/or one or more cavities arranged within one or more respective turbine engine components. The present invention, of course, is not limited to any particular passage types or configurations. In addition, the first lubricant circuit 76 may also include a second lubricant heat exchanger; e.g., where the one of the heat exchangers is a lubricant-air heat exchanger and the other is a fuel-lubricant heat exchanger.

The lubricant heat exchanger 92 is configured as a lubricant-air heat exchanger such as, for example, a tube and fin radiator. The lubricant heat exchanger 92 may be sized based on how much heat energy the turbine engine component 94 generates during engine operation. The lubricant heat exchanger 92 includes a lubricant passage 96 and an air passage 98 (e.g., an air duct). The air passage 98 has an airflow area (e.g., a frontal cross-sectional passage area). The lubricant passage 96 and the air passage 98 are arranged in a cross flow configuration. The lubricant passage 96 and the air passage 98, however, may alternatively or additionally be arranged in a counter flow configuration and/or a parallel flow configuration.

Referring to FIG. 2, the turbine engine component 94 includes the gear train 32, a lubricant distribution device 100 and a lubricant collection device 102. The lubricant distribution device 100 directs lubricant to one or more of the gears 52-54 and/or to one or more of the bearings 60. The lubricant distribution device 100 may be configured as, for example, a lubricant manifold, a spray nozzle, etc. The lubricant collection device 102 collects lubricant that is discharged from the gear train 32. The lubricant collection device 102 may be configured as, for example, a lubricant collection gutter that at least partially circumscribes the gear train 32. The lubricant collection device 102 may alternatively be configured as or additionally include a sump (not shown) for an engine compartment 104 in which the gear train 32 is located. The present invention, however, is not limited to any particular lubricant collect device or lubricant reservoir types or configurations.

The second lubricant circuit 78 includes a lubricant heat exchanger 106 and a turbine engine component 108, which are fluidly coupled together by one or more passages 109. One or more of these passages 109 may be defined by one or more conduits (e.g., pipes, hoses, etc.). One or more of the passages 109 may also or alternatively be defined by one or more apertures (e.g., through holes, channels, etc.) that extend through (or into) and/or one or more cavities arranged within one or more respective turbine engine components. The present invention, of course, is not limited to any particular passage types or configurations. In addition, the second lubricant circuit 78 may also include a second lubricant heat exchanger; e.g., where the one of the heat exchangers is a lubricant-air heat exchanger and the other is a fuel-lubricant heat exchanger.

The lubricant heat exchanger 106 is configured as a lubricant-air heat exchanger such as, for example, a tube and fin radiator. The lubricant heat exchanger 106 may be sized based on how much heat energy the turbine engine component 108 generates during engine operation. The lubricant heat exchanger 106 includes a lubricant passage 110 and an air passage 112 (e.g., an air duct). The air passage 112 has an airflow area (e.g., a frontal cross-sectional passage area), which may be different (e.g., less or greater) than or substantially equal to the airflow area of the air passage 98. In this manner, the lubricant heat exchangers 92 and 106 may each be tailored to the specific thermal loads of the turbine engine components 94 and 108. The lubricant heat exchanger 92, for example, may have a higher cooling capacity than that of the lubricant heat exchanger 108. The lubricant passage 110 and the air passage 112 are arranged in a cross flow configuration. The lubricant passage 110 and the air passage 112, however, may alternatively or additionally be arranged in a counter flow configuration and/or a parallel flow configuration.

The turbine engine component 108 includes at least one of the bearings 64 supporting the shaft 34, 36 or 60, a lubricant distribution device 114 and a lubricant collection device 116. The lubricant distribution device 114 directs lubricant to the bearing 64. The lubricant distribution device 114 may be configured as, for example, a lubricant manifold, a spray nozzle, etc. The lubricant collection device 116 collects lubricant that is discharged by the bearing 64. The lubricant collection device 116 may be configured as, for example, a sump (not shown) for an engine compartment 118 (e.g., bearing compartment) in which the bearing 64 is located (see FIG. 1). The present invention, however, is not limited to any particular lubricant collect device or lubricant reservoir types or configurations.

The first lubricant circuit 76 is configured in parallel with the second lubricant circuit 78. The first and the second lubricant circuits 76 and 78 are fluidly coupled between the lubricant pump 74 and the lubricant reservoir 72. For example, the first and the second lubricant circuits 76 and 78 are fluidly coupled to an outlet 119 of the lubricant pump 74. The lubricant passage 90 is fluidly coupled between the outlet 88 and respective inlets 120 and 122 of the lubricant passages 96 and 110. An outlet 124 of the lubricant passage 96 is fluidly coupled with the lubricant distribution device 100. The lubricant collection device 102 is fluidly coupled with the first inlet 84. An outlet 126 of the lubricant passage 110 is fluidly coupled with the lubricant distribution device 114. The lubricant collection device 116 is fluidly coupled with the second inlet 86.

Figure 5:
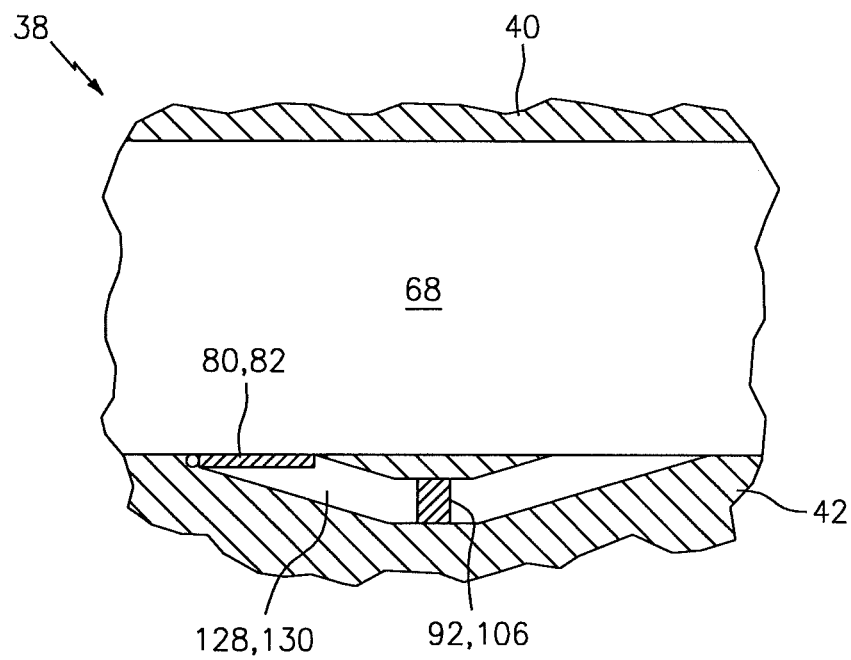
FIG. 5 is a partial sectional illustration of an engine housing for the engine of FIG. 1 during a first operating state.
Figure 6:
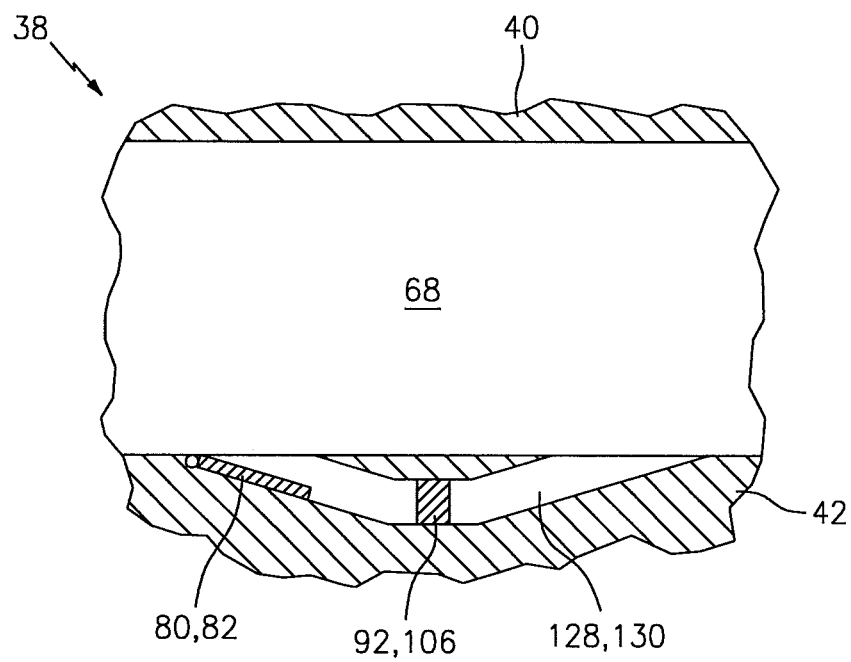
FIG. 6 is a partial sectional illustration of the engine housing of FIG. 5 during a second operating state.

Referring to FIGS. 5 and 6, the first valve 80 is fluidly coupled between the bypass gas path 68 and the lubricant heat exchanger 92. The first valve 80 and/or the lubricant heat exchanger 92 are arranged within a duct 128 that is fluidly coupled with the bypass gas path 68. Alternatively, the first valve 80 and the lubricant heat exchanger 92 may be fluidly coupled with another gas path of the engine 20 (e.g., the core gas path 66), or configured to receive air from outside of the engine housing 38.

The second valve 82 is fluidly coupled between the bypass gas path 68 and the lubricant heat exchanger 106. The second valve 82 and/or the lubricant heat exchanger 106 are arranged within a duct 130 that is fluidly coupled with the bypass gas path 68. This duct 130 may be the same as the duct 128 in which the first valve 80 and/or the lubricant heat exchanger 92 are located, or the duct 130 may be different than the duct 128. Alternatively, the second valve 82 and the lubricant heat exchanger 106 may be fluidly coupled with another gas path of the engine 20 (e.g., the core gas path 66), or configured to receive air from outside of the engine housing 38. Still alternatively, the second valve 82 may be omitted and a manifold may be arranged and fluidly coupled between the first valve and the air passages 98 and 112.

During operation of the system of FIG. 4, the lubricant pump 74 directs lubricant (e.g., lubrication oil) through the first and the second lubricant circuits 76 and 78 to the lubricant reservoir 72. The first valve 80 regulates or substantially prevents the flow of the bypass air through the lubricant heat exchanger 92. The lubricant heat exchanger 92 transfers heat energy from the lubricant flowing through the lubricant passage 96 into the bypass air flowing through the air passage 98. The lubricant flowing through or otherwise contacting the gear train 32 absorbs heat energy generated by the gear train 32, thereby cooling the gears 52-54 and/or the bearings 60.

Referring to FIG. 6, where the gear train 32 generates a relatively large amount of heat energy, the first valve 80 may increase the flow of bypass air through the lubricant heat exchanger 92. Referring now to FIG. 5, where the gear train 32 generates a relatively small amount of heat energy, the first valve 80 may reduce or substantially prevent the flow of bypass air through the lubricant heat exchanger 92. In this manner, referring again to FIG. 4, the temperature of the lubricant provided by the lubricant heat exchanger 92 to the turbine engine component 94 may be regulated based on, for example, the changing cooling needs of the turbine engine component 94.

The second valve 82 regulates or substantially prevents the flow of the bypass air through the lubricant heat exchanger 106. The lubricant heat exchanger 106 may transfer heat energy from the lubricant flowing through the lubricant passage 110 into the bypass air flowing through the air passage 112. The lubricant flowing through or otherwise contacting the bearing 64 may absorb heat energy generated by the bearing 64, thereby cooling the bearing 64.

Referring to FIG. 6, where the bearing 64 generates a relatively large amount of heat energy, the second valve 82 may increase the flow of bypass air through the lubricant heat exchanger 106. Referring now to FIG. 5, where the bearing 64 generates a relatively small amount of heat energy, the second valve 82 may reduce or substantially prevent the flow of bypass air through the lubricant heat exchanger 106. In this manner, referring again to FIG. 4, the temperature of the lubricant provided by the lubricant heat exchanger 106 to the turbine engine component 108 may be regulated based on, for example, the changing cooling needs of the turbine engine component 108.

Figure 7:
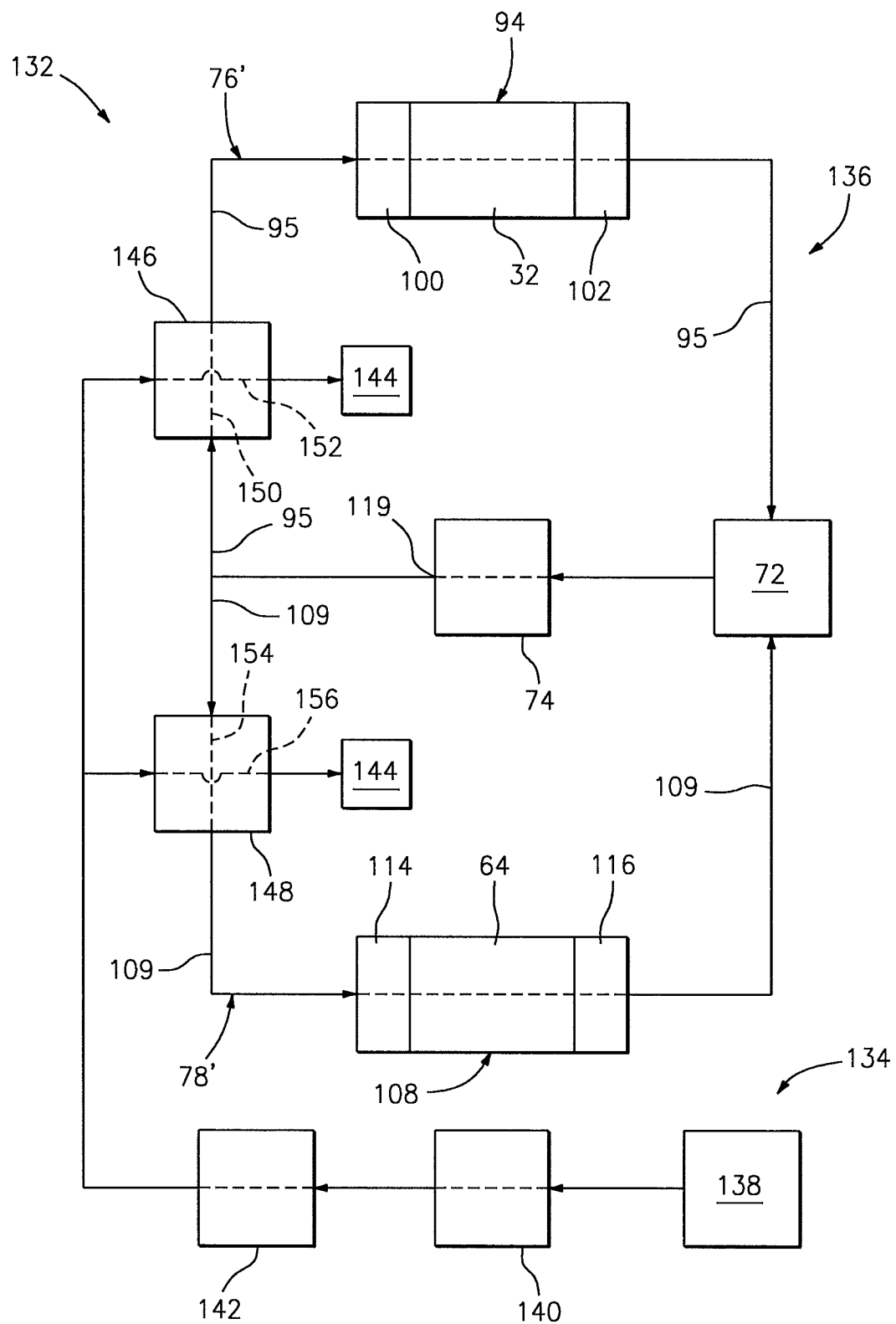
FIG. 7 is a schematic illustration of a fuel system and a multi-circuit lubrication system for the engine of FIG. 1.

FIG. 7 is a schematic illustration of a turbine engine system 132 for the engine 20 of FIG. 1. The turbine engine system 132 includes a fuel system 134 and a multi-circuit lubrication system 136. The fuel system 134 includes a fuel reservoir 138 (e.g., an aircraft fuel tank) that is fluidly coupled with one or more fuel pumps 140 and 142. The fuel pumps 140 and 142 are fluidly coupled with one or more injectors 144 included in the combustor section 30 (see FIG. 1). The fuel pumps 140 and 142 direct fuel from the fuel reservoir 138 to the injectors 144.

In contrast to the lubrication system 70 of FIG. 4, one or more of lubricant heat exchangers 146 and 148 of the lubrication system 136 are each configured as a lubricant-fuel heat exchanger. The lubricant heat exchanger 146 includes a lubricant passage 150 that is fluidly coupled between the lubricant pump 74 and the lubricant distribution device 100. The lubricant heat exchanger 146 also includes a fuel passage 152 that is fluidly coupled between the fuel pump 142 and the one or more injectors 144. The lubricant heat exchanger 148 includes a lubricant passage 154 that is fluidly coupled between the lubricant pump 74 and the lubricant distribution device 114. The lubricant heat exchanger 148 also includes a fuel passage 156 that is fluidly coupled between the fuel pump 142 and the one or more injectors 144.

Figure 8:
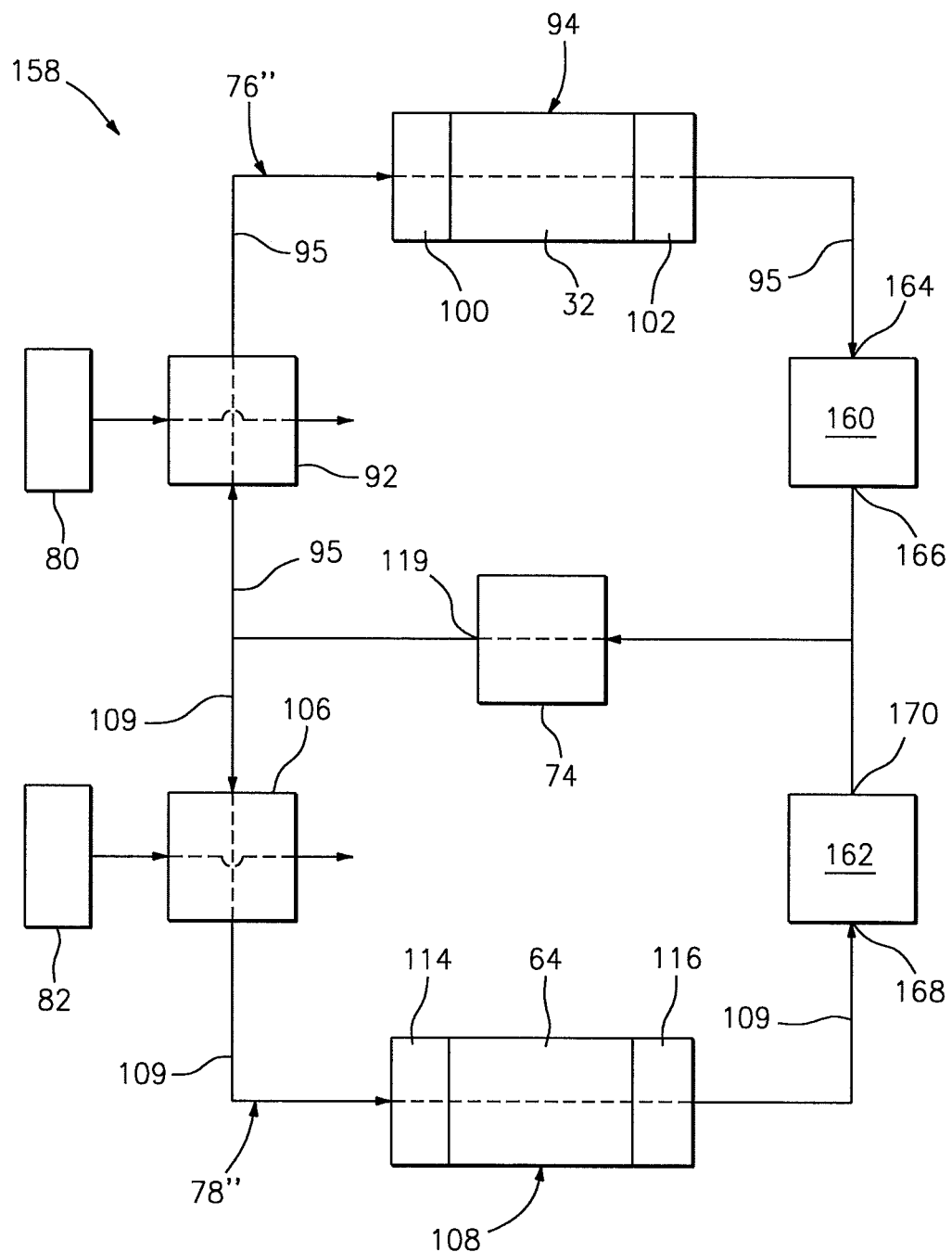
FIG. 8 is a schematic illustration of another multi-circuit lubrication system for the engine of FIG. 1.

FIG. 8 is a schematic illustration of another multi-circuit lubrication system 158 for the engine 20 of FIG. 1. In contrast to the lubrication system 70 of FIG. 4, the lubrication system 158 includes one or more lubricant reservoirs 160 and 162 that replace (or are added in addition to) the lubricant reservoir 72. The first lubricant reservoir 160 is configured with the first lubricant circuit $76^{ii}$. The lubricant collection device 102 is fluidly coupled with an inlet 164 of the first lubricant reservoir 106. An outlet 166 of the first lubricant reservoir 106 is fluidly coupled with the lubricant pump 74. The second lubricant reservoir 162 is configured with the second lubricant circuit $78^{ii}$, and thus in parallel with the first lubricant reservoir 160. The lubricant collection device 116 is fluidly coupled with an inlet 168 of the second lubricant reservoir 162. An outlet 170 of the second lubricant reservoir 162 is fluidly coupled with the lubricant pump 74.

Figure 9:
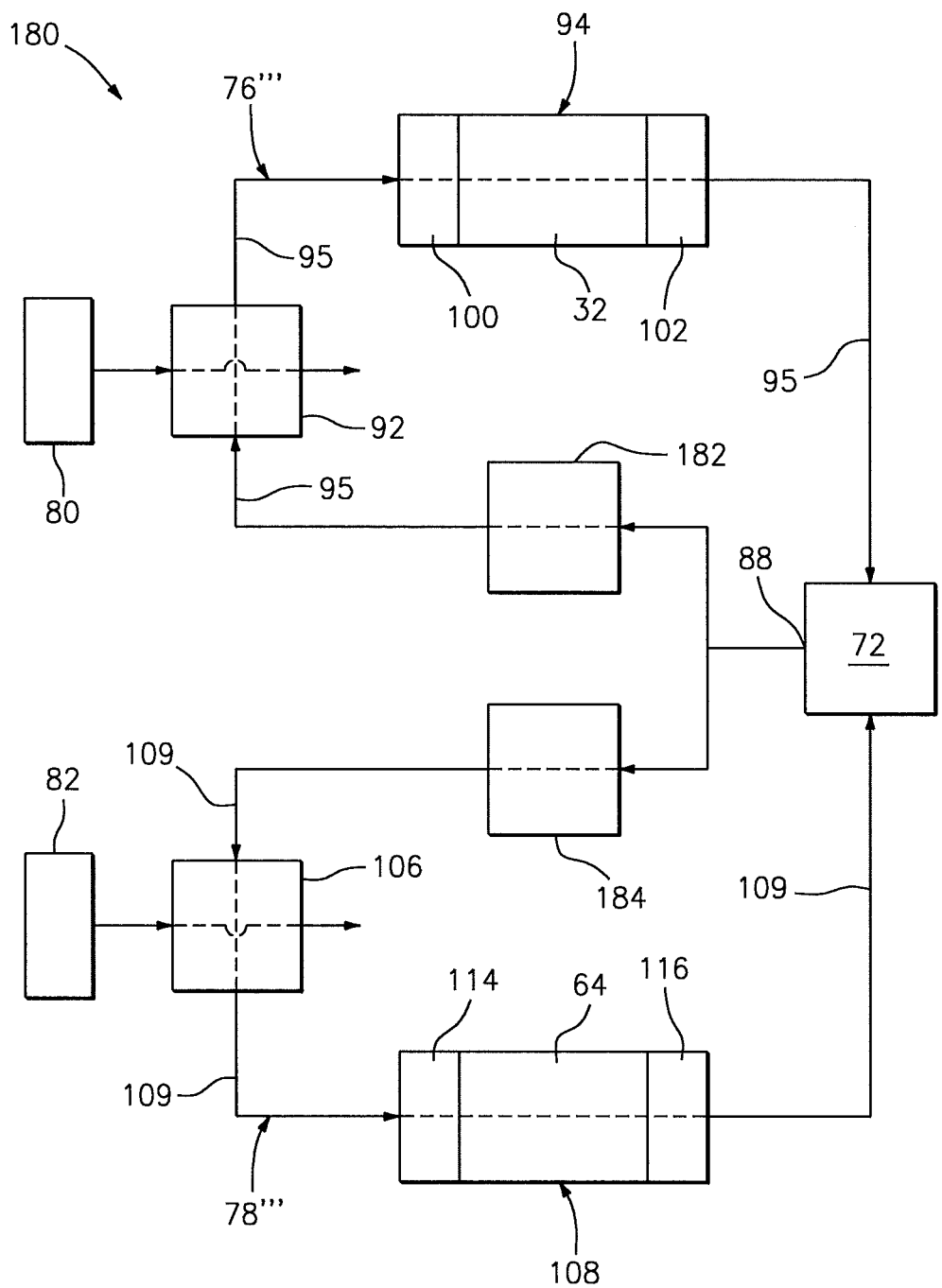
FIG. 9 is a schematic illustration of another multi-circuit lubrication system for the engine of FIG. 1.

FIG. 9 is a schematic illustration of another multi-circuit lubrication system 180 for the engine 20 of FIG. 1. In contrast to the lubrication system 70 of FIG. 4, the lubrication system 180 includes one or more lubricant pumps 182 and 184 that replace (or are added in addition to) the lubricant pump 74. The first lubricant pump 182 is configured with the first lubricant circuit $76^{iii}$. The first lubricant pump 182 is fluidly coupled between the outlet 88 the lubricant heat exchanger 92. The second lubricant pump 184 is configured with the second lubricant circuit $78^{iii}$, and thus in parallel with the first lubricant pump 182. The second lubricant pump 184 is fluidly coupled between the outlet 88 and the lubricant heat exchanger 106.

Figure 10:
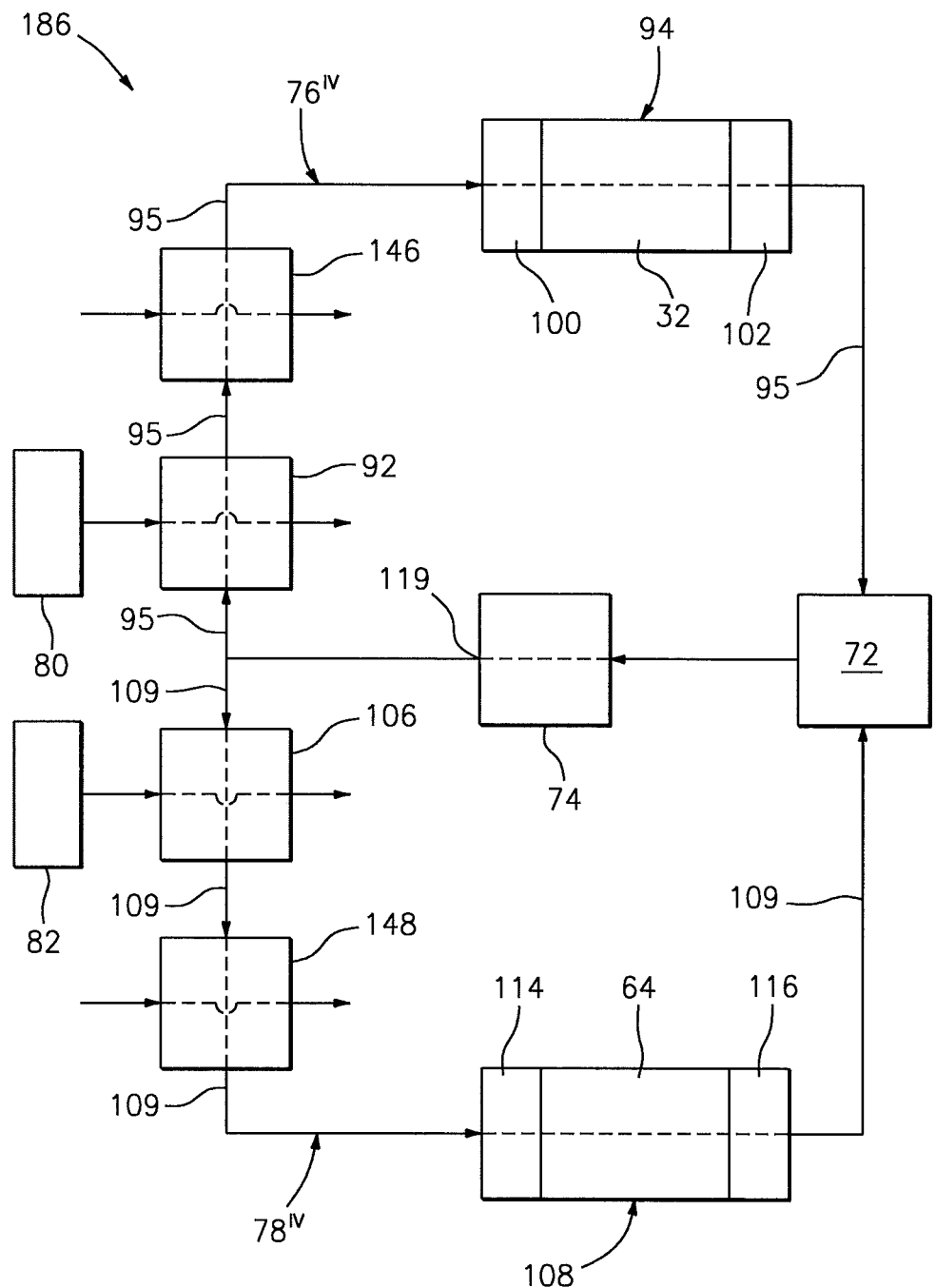
FIG. 10 is a schematic illustration of another multi-circuit lubrication system for the engine of FIG. 1.

FIG. 10 is a schematic illustration of another multi-circuit lubrication system 186 for the engine 20 of FIG. 1. In contrast to the lubrication system 70 of FIG. 4, the lubrication system 186 further includes one or more of the lubricant-fuel heat exchangers 146 and 148. The lubricant-fuel heat exchanger 146 is configured in the first lubricant circuit $76^{iv}$. The lubricant-fuel heat exchanger 146, for example, is fluidly coupled between the lubricant heat exchanger 92 and lubricant distribution device 100. The lubricant-fuel heat exchanger 148 is configured in the second lubricant circuit $78^{iv}$, and thus in parallel with the lubricant-fuel heat exchanger 146. The lubricant-fuel heat exchanger 148, for example, is fluidly coupled between the lubricant heat exchanger 106 and the lubricant distribution device 114. In another embodiment, one of the heat exchangers 92 or 146 may be omitted from the first lubricant circuit $76^{iv}$. In still another embodiment, one of the heat exchangers 106 or 148 may be omitted from the second lubricant circuit $78^{iv}$.

Figure 11:
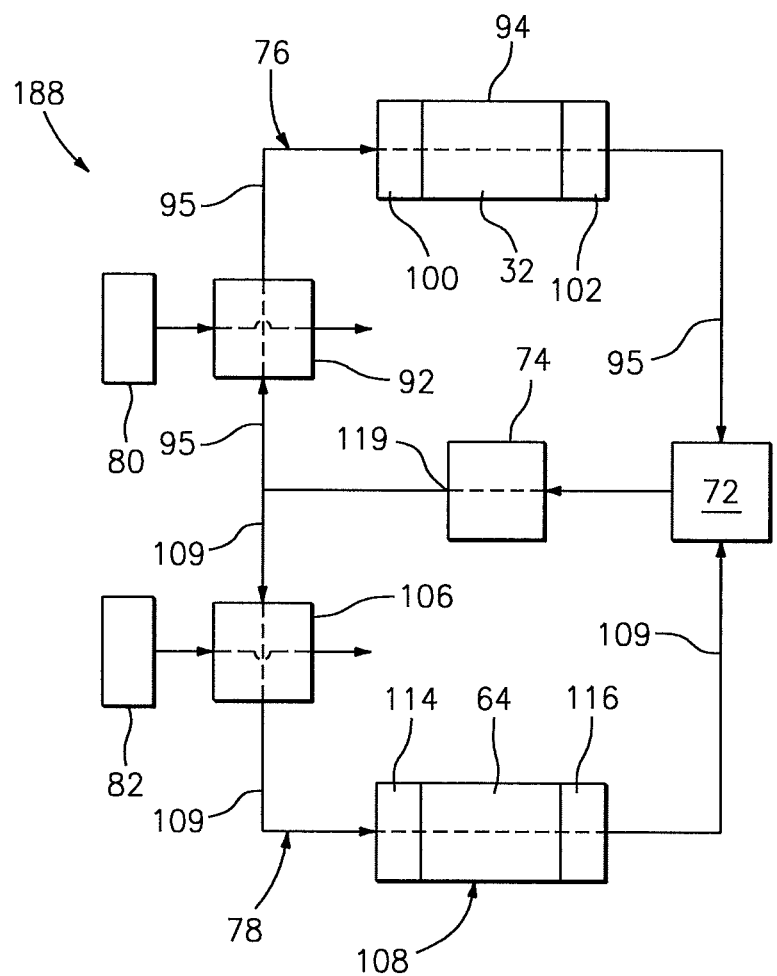
FIG. 11 is a schematic illustration of still another multi-circuit lubrication system for the engine of FIG. 1.
Figure 11:
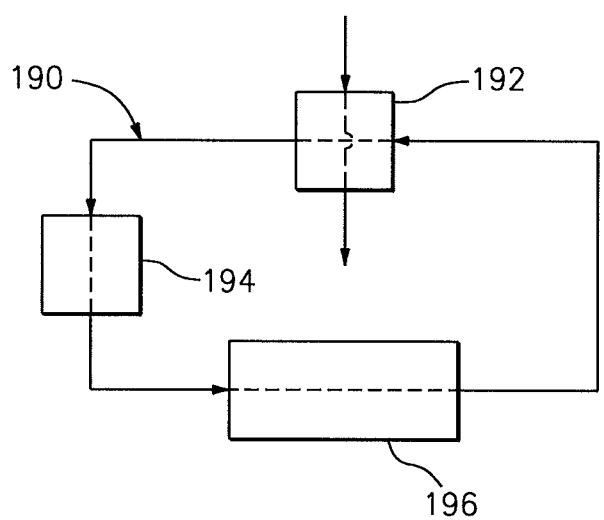

FIG. 11 is a schematic illustration of another multi-circuit lubrication system 188 for the engine 20 of FIG. 1. In contrast to the lubrication system 70 of FIG. 4, the lubrication system 188 further includes a third lubricant circuit 190. The third lubricant circuit 190 is configured as a closed-loop lubricant circuit, and is discrete from the first and/or the second lubricant circuits 76 and 78. The third lubricant circuit 190 includes and circulates second lubricant through a lubricant heat exchanger 192 (e.g., a lubricant-air radiator), a lubricant pump 194 (e.g., a mechanical or electrical pump), and a generator 196. The third lubricant circuit 190 may also or alternatively include and provide lubricant to one or more components other than the generator 196.

The generator 196 is driven by a turbine engine component such as the accessory gearbox (not shown), one of the engine rotors 44-48, one of the shafts 34 and 36, or any other rotor included in the engine 20. The generator 196 is configured to generate electrical power for electrical equipment such as a turbine engine control system, aircraft avionics, etc.

One or more of the lubricant circuits 76 and 78 and/or the derivations thereof may have various configurations other than that described above. For example, one or more of the lubricant circuits may each include one or more additional lubrication system components such as, for example, a lubricant filtering device, an oil strainer (e.g., a last chance strainer), a pressure regulator, a deoiler, a chip detector or any other type of lubricant conditioning and/or monitoring device. One or more of the components of the first and/or the second lubricant circuits may be arranged and fluidly coupled in various serial and/or parallel configurations other than those described above and illustrated in the drawings.

The present invention therefore is not limited to any particular lubricant circuit configurations.

One or more of the lubrication system components may have various configurations other than those described above and illustrated in the drawings. For example, one or more of the turbine engine components 94 and 108 may each alternatively or additionally include at least another one of the bearings 64 supporting at least one of the shafts 34, 36 and 62. One of the turbine engine components 94 and 108 may alternatively or additionally include a heat exchanger for cooling electronic equipment such as aircraft avionics, a high powered sensor system, etc. One or more of the turbine engine components 94 and 108 may each alternatively or additionally include one or more seals and/or any other type of turbine engine component that receives lubricant for lubrication, cooling and/or heating. The lubricant pumps 182 and 184 (see FIG. 9) may be configured with a common housing and/or may be driven by a common shaft connected to discrete impellers. One or more of the lubricant, air and/or fuel passages may each include a plurality of parallel sub-passages. One or more of the lubricant, air and/or fuel passages may each include one or more heat transfer enhancement features such as ribs, pedestals and/or any other types of protrusions and/or recesses that increase surface area of the passage. The present invention therefore is not limited to any particular lubrication system component types or configurations.

The terms "upstream", "downstream", "inner" and "outer" are used to orient the components described above relative to the turbine engine 20 and its axis 22. A person of skill in the art will recognize, however, one or more of these components may be utilized in other orientations than those described above. The present invention therefore is not limited to any particular component spatial orientations.

A person of skill in the art will recognize the disclosed turbine engine systems may be included in various turbine engines other than the one described above. The turbine engine systems, for example, may be included in a geared turbine engine in which a gear train connects one or more shafts to one or more rotors in a fan section and/or a compressor section. Alternatively, the turbine engine systems may be included in a turbine engine configured without a gear train. The turbine engine systems may be included in a turbine engine configured with a single spool, with two spools as illustrated in FIG. 1, or with more than two spools. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine system, comprising:
a first lubricant circuit comprising a first turbine engine component and a first lubricant heat exchanger fluidly coupled with the first turbine engine component, wherein the first turbine engine component comprises a gear train, and an entirety of the first lubricant circuit extends between distal first ends;

a second lubricant circuit comprising a second turbine engine component and a second lubricant heat exchanger fluidly coupled with the second turbine engine component, wherein an entirety of the second lubricant circuit extends between distal second ends, the distal second ends of the second lubricant circuit are respectively fluidly coupled with the distal first ends of the first lubricant circuit, the second lubricant circuit is fluidly decoupled from the first lubricant circuit between the distal second ends, the first lubricant circuit is fluidly decoupled from the second lubricant circuit between the distal first ends, the second lubricant heat exchanger is parallel to the first lubricant heat exchanger, and the second turbine engine component comprises a bearing;

a plurality of engine stages, wherein the gear train connects a first of the plurality of engine stages to a second of the plurality of engine stages; and a shaft supported by the bearing, and connected to one of the plurality of engine stages;

the first lubricant heat exchanger comprising a first lubricant-air heat exchanger and/or the second lubricant heat exchanger comprising a second lubricant-air heat exchanger.

2. The system of claim 1, wherein the first lubricant circuit is configured in parallel with the second lubricant circuit.

3. The system of claim 1, further comprising a lubricant reservoir that receives lubricant from the first lubricant circuit and the second lubricant circuit, and that provides the lubricant to the first lubricant circuit and the second lubricant circuit.

4. The system of claim 1, further comprising a lubricant pump comprising an outlet that is fluidly coupled with the first lubricant circuit and the second lubricant circuit.

5. The system of claim 1, wherein
the first lubricant circuit further comprises a first lubricant pump; and
the second lubricant circuit further comprises a second lubricant pump.

6. The system of claim 1, wherein at least one of the first lubricant circuit and the second lubricant circuit each further comprises a lubricant reservoir.

7. The system of claim 1, wherein at least one of the first lubricant circuit and the second lubricant circuit each further comprises another lubricant heat exchanger.

8. The system of claim 1, wherein at least one of the first lubricant heat exchanger and the second lubricant heat exchanger each comprises a lubricant-fuel heat exchanger.

9. The system of claim 1, further comprising a valve for regulating air flow through the first lubricant heat exchanger which comprises the first lubricant-air heat exchanger.

10. The system of claim 1, further comprising a valve for regulating air flow through the second lubricant heat exchanger which comprises the second lubricant-air heat exchanger.

11. The system of claim 1, wherein the first of the plurality of engine stages comprises a fan stage.

12. The system of claim 1, wherein
the first lubricant heat exchanger comprises the first lubricant-air heat exchanger and has a first airflow area;
the second lubricant heat exchanger comprises the second lubricant-air heat exchanger and has a second airflow area; and
the first airflow area is greater than the second airflow area.

13. The system of claim 1, further comprising: a third lubricant circuit comprising a generator, the third lubricant circuit fluidly decoupled from the first lubricant circuit and the second lubricant circuit.

14. The system of claim 13, further comprising:
at least one of a lubricant reservoir and a lubricant pump;
wherein the first lubricant circuit and the second lubricant circuit are fluidly coupled with the at least one of the lubricant reservoir and the lubricant pump.

15. The system of claim 13, wherein one of the first lubricant circuit and the second lubricant circuit further comprises at least one of a lubricant reservoir, a lubricant pump and another lubricant heat exchanger.

* * * * *